US011327937B1

(12) United States Patent
Muniswamy Reddy et al.

(10) Patent No.: US 11,327,937 B1
(45) Date of Patent: May 10, 2022

(54) DETERMINING INDEXING PROGRESS FOR A TABLE IN A DISTRIBUTED DATA STORE

(71) Applicant: Amazon Technologies, Inc., Seattle, WA (US)

(72) Inventors: Kiran Kumar Muniswamy Reddy, Sammamish, WA (US); Yijun Lu, Kenmore, WA (US); Wei Xiao, Bellevue, WA (US); Pejus Manoj Das, Shoreline, WA (US); Shirley Xue Yi Ly, Bellevue, WA (US); Aanchal Gupta, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 845 days.

(21) Appl. No.: 14/859,059

(22) Filed: Sep. 18, 2015

(51) Int. Cl.
*G06F 16/22* (2019.01)
*G06F 16/27* (2019.01)
(Continued)

(52) U.S. Cl.
CPC .... *G06F 16/2228* (2019.01); *G06F 16/24578* (2019.01); *G06F 16/278* (2019.01); *G06F 16/282* (2019.01)

(58) Field of Classification Search
CPC ........ G06F 17/30575; G06F 17/30584; G06F 17/30215; G06F 17/30286; G06F 17/30289; G06F 17/30321; G06F 17/30339; G06F 17/30194; G06F 17/303; G06F 17/30333; G06F 17/30094; G06F 17/30; G06F 17/30106; G06F 17/30592; G06F 17/301; G06F 17/30159; G06F 17/30244; G06F 17/30492; G06F 17/30569; G06F 17/30079; G06F 11/0709; G06F 16/2228; G06F 16/2255; G06F 16/24557; G06F 16/22; G06F 16/2282; G06F 16/2471; G06F 16/27; G06F 16/278; G06F 16/00;
(Continued)

(56) References Cited

U.S. PATENT DOCUMENTS 5,548,770 A * 8/1996 Bridges ............. G06F 16/24532
6,112,209 A    8/2000 Gusack
(Continued)

OTHER PUBLICATIONS

U.S. Appl. No. 14/859,055, filed Sep. 18, 2015, Kiran Kumar Muniswamy Reddy, et al.
(Continued)

*Primary Examiner* — Alford W Kindred
*Assistant Examiner* — Cecile H Vo
(74) *Attorney, Agent, or Firm* — Robert C. Kowert; Kowert, Hood, Munyon, Rankin & Goetzel, P.C.

(57) ABSTRACT

A distributed data storage system may implement determining indexing progress for a table stored in the distributed data storage system. A table may be stored in multiple table partitions. When a secondary index is created for the table, each partition may independently index the items stored within the table partition in order to identify those items in the partition that should be stored in the secondary index. During creation of the secondary index, creation progress points that indicate the progress of the indexing across the table partitions may be determined. The creation progress points may be provided via a programmatic, textual, or graphical interface to the distributed data storage system.

20 Claims, 8 Drawing Sheets

(51) Int. Cl.
*G06F 16/28* (2019.01)
*G06F 16/2457* (2019.01)
*G06F 16/24* (2019.01)

(58) Field of Classification Search
CPC .. G06F 16/2264; G06F 16/254; G06F 16/258;
G06F 16/51; G06F 16/2343; G06F
16/273; G06F 16/284; G06F 16/31; G06F
16/901; G06F 16/951; G06F 16/282;
G06F 16/24578; G06F 16/21
USPC ....... 707/634, 803, 968, 972, 638, 741, 743,
707/616, 673, 696, 714, 756, 769,
707/999.001, E17.032, E17.002, E17.123,
707/705, 715, 755, 999.1, 999.102,
707/999.103, 744, 609
See application file for complete search history.

(56) References Cited

U.S. PATENT DOCUMENTS

| | | | |
|---|---|---|---|
| 6,870,812 | B1 | 3/2005 | Kloth et al. |
| 7,373,241 | B2 | 5/2008 | Bauerle et al. |
| 7,702,628 | B1 | 4/2010 | Luchangco et al. |
| 8,311,964 | B1 | 11/2012 | Efstathopoulos et al. |
| 8,504,691 | B1* | 8/2013 | Tobler ............... H04L 67/02 709/226 |
| 8,601,000 | B1 | 12/2013 | Stefani et al. |
| 8,837,285 | B2 | 9/2014 | Sammour et al. |
| 9,116,862 | B1* | 8/2015 | Rath ............... G06F 11/1425 |
| 9,239,874 | B1 | 1/2016 | Madany et al. |
| 9,384,227 | B1 | 7/2016 | Xiao et al. |
| 9,385,956 | B2 | 7/2016 | Xiao et al. |
| 9,430,156 | B1 | 8/2016 | Shilane et al. |
| 9,471,500 | B2 | 10/2016 | Kruus et al. |
| 2005/0160108 | A1 | 7/2005 | Charlet et al. |
| 2006/0080345 | A1 | 7/2006 | Murthy et al. |
| 2007/0073489 | A1* | 3/2007 | Kurnik ............... G06K 9/0053 702/20 |
| 2007/0112795 | A1 | 5/2007 | Travison et al. |
| 2007/0239769 | A1* | 10/2007 | Fazal ............... G06F 16/283 |
| 2010/0138456 | A1 | 6/2010 | Aghili |
| 2011/0035205 | A1 | 2/2011 | Brideson et al. |
| 2011/0264668 | A1 | 10/2011 | Hacker et al. |
| 2012/0059823 | A1 | 3/2012 | Barber et al. |
| 2012/0330954 | A1* | 12/2012 | Sivasubramanian ............ H04L 67/2804 707/737 |
| 2013/0110845 | A1* | 5/2013 | Dua ............... G06F 16/245 707/741 |
| 2013/0332610 | A1 | 12/2013 | Beveridge |
| 2014/0046917 | A1 | 2/2014 | Smith |
| 2014/0112147 | A1 | 4/2014 | Esposito |
| 2014/0195720 | A1 | 7/2014 | Akella et al. |
| 2014/0196048 | A1* | 7/2014 | Mathur ............... G06F 9/485 718/104 |
| 2014/0279855 | A1 | 9/2014 | Tan et al. |
| 2015/0134626 | A1* | 5/2015 | Theimer ............ G06F 11/3055 707/693 |
| 2015/0142733 | A1* | 5/2015 | Shadmon .......... G06F 17/30289 707/609 |

OTHER PUBLICATIONS

"Global Secondary Indexes—Amazon DynamoDB", Retrieved from URL: http://docs.aws.amazon.com/amazondynamodb/latest/developerguide/GSI.html on Jul. 2, 2016, pp. 1-9.

U.S. Appl. No. 14/859,072, filed Sep. 18, 2015, Kiran Kimar Muniswamy Reddy et al.

U.S. Appl. No. 14/859,075, filed Sep. 18, 2015, Aanchal Gupta et al.

U.S. Appl. No. 14/859,062, filed Sep. 18, 2015, Wei Xiao et al.

U.S. Appl. No. 14/858,360, filed Sep. 18, 2015, Aanchal Gupta et al.

U.S. Appl. No. 14/859,069, filed Sep. 18, 2015, Kiran Kumar Muniswamy Reddy et al.

Chalkiadaki, Maria, and Kostas Magoutis. "Managing service performance in nosql distributed storage systems." Proceedings of the 7th workshop on middleware for next generation internet computing. ACM, 2012, pp. 1-6.

Kim, Je-Min et al."Androbench: Benchmarking the storage performance of android-based mobile devices." Frontiers in Computer Education, 2012, pp. 667-674.

Narasayya, Vivek R., et al. "SQLVM: Performance Isolation in Multi-Tenant Relational Database-as-a-Service." CI DR. 2013, pp. 1-9.

Kavalanekar, Swaroop, et al. "Measuring database performance in on line services: a trace-based approach." Technology Conference on Performance Evaluation and Benchmarking. Springer Berlin Heidelberg, 2009, pp. 1-14.

Bose, Sharada, et al. "Benchmarking database performance in a virtual environment." Technology Conference on Performance Evaluation and Benchmarking. Springer Berlin Heidelberg, 2009, pp. 1-16.

Kallman, Robert, et al. "H-store: a high-performance, distributed main memory transaction processing system." Proceedings of the VLDB Endowment 1.2 (2008): 1496-1499.

Lee, Taerim, et al. "Implementation and performance of distributed text processing system using hadoop fore-discovery cloud service." Journal of Internet Services and Information Security (JISIS) 4.1 (2013): 12-24.

* cited by examiner

DETERMINING INDEXING PROGRESS FOR A TABLE IN A DISTRIBUTED DATA STORE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index. Creating secondary indexes, however, can be challenging. Secondary index creation can be resource intensive and may create opportunities for inconsistency between data stored in the database table and the secondary index.

Figure 1:
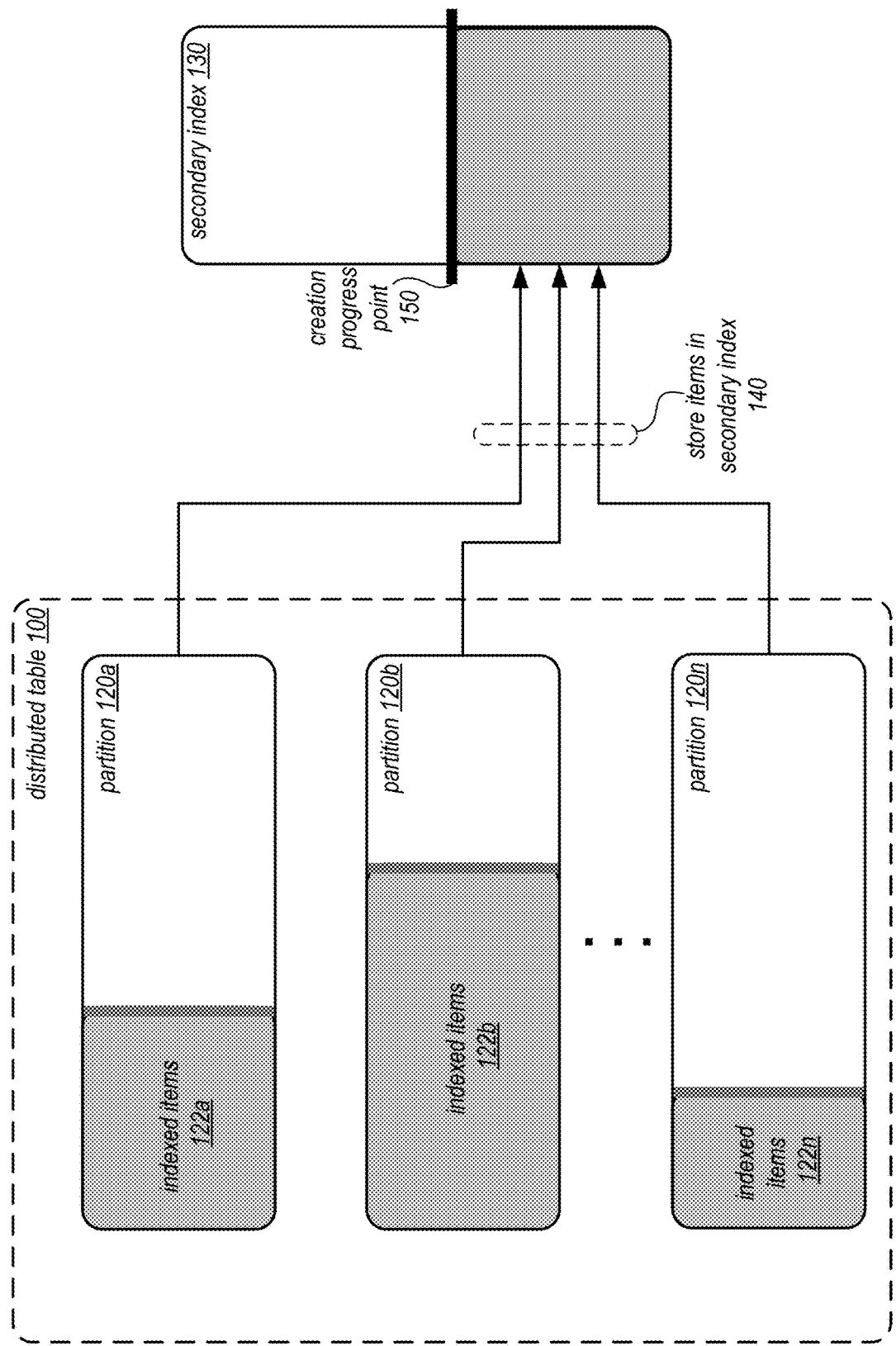
FIG. 1 is a logical block diagram illustrating a creation progress point for a secondary index that is being created, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement determining indexing progress for a table in a distributed data store. Distributed data stores offer accessible and scalable storage to one or more multiple different clients. Tables of items (which may include one or more data values or attributes) may be stored, managed and accessed at a data store. Different types of distributed data stores exist. Relational data stores may be implemented which organize and maintain data according to a relational scheme (e.g., a common set of data fields for an entry in a table). Non-relational data stores may be implemented which organize and maintain data according to a key value pair which uniquely identifies an item in the table. Key value pairs, or other indexing schemes (which may also be implemented in relational data stores) may allow for fast throughput to update data in items or store new items. However, in some scenarios, locating items that have particular attributes may be resource intensive. For instance, if a non-relational data store is only searchable by key value pair, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a relational or non-relational data store in order to provide an alternative access schema for items in addition to a unique key value pair. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above, (which may be very costly in the case of a non-relational data store). Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternative access capabilities to data, creating the secondary index may be a long running operation. Additionally, continuing to allow access to a table for which a secondary index is being created (e.g., the table is online) may slow down the rate at which the secondary index may be created. Updates to a table received from a client may need to be replicated to the secondary index, for instance, in order to maintain consistent data. Therefore, it may be beneficial to provide an indication of the progress of the creation of the secondary index to users or system management components so that performance changes can be made to increase (or decrease) the rate at which the secondary index is created. However distributed data stores may increase the complexity of determining creation progress for creating a secondary index. Different portions of the table may be stored in different locations and subject to differing performance conditions when be being indexed to create the secondary index. Determining indexing progress for a table in a distributed data store may have to account for the potential differences in progress amongst distributed data store components in order to provide an accurate indication of creation progress.

FIG. 1 is a logical block diagram illustrating a creation progress point for a secondary index that is being created, according to some embodiments. Distributed table 100 may be a table of data (e.g., items) that is stored, managed, and maintained in distributed fashion. Thus distributed table may be maintained in partitions 120a, 120b, through 120n across different partition nodes, hosts, servers, or other computing devices (e.g., system 1000 in FIG. 8) that stores a partition of distributed table 100 in a distributed data store. Distributed table 100 may be partitioned in different ways. For instance, each partition may in some embodiments, store a portion of primary key space (e.g., one or more attribute values that uniquely identify an item in a table) for the table so that items with primary key values (or derived from the primary key values, such as by a hash function) may be stored in the corresponding partition 120. While some partitioning schemes may result in near even distributions of items across partitions, other distributions may result in some partitions storing significantly more items than others.

When creating a secondary index 130 for distributed table 130, different partitions of the table may be independently indexed to identify the items to be stored 140 in secondary index 130. Independent performance of indexing may lead to varying rates of indexing and completion of indexing for the secondary table. For example, as illustrated in FIG. 1, the indexed items identified in partitions 120a, such as indexed items 122a, 122b, and 122n, may vary. This may be due to an uneven distribution, as noted above, or to other factors that may influence the performance of indexing for a partition. As distributed table 100 may be online during creation of secondary index 130, the resources at a partition host to service access requests to distributed table 100 may reduce the capacity of the host to index items in the partition. A host for partition 120a, for instance, may have to service a higher volume of requests for data in partition 120a, than a host for partition 120b, which has a higher amount of items indexed 122b, and thus greater indexing progress made.

Figure 6:
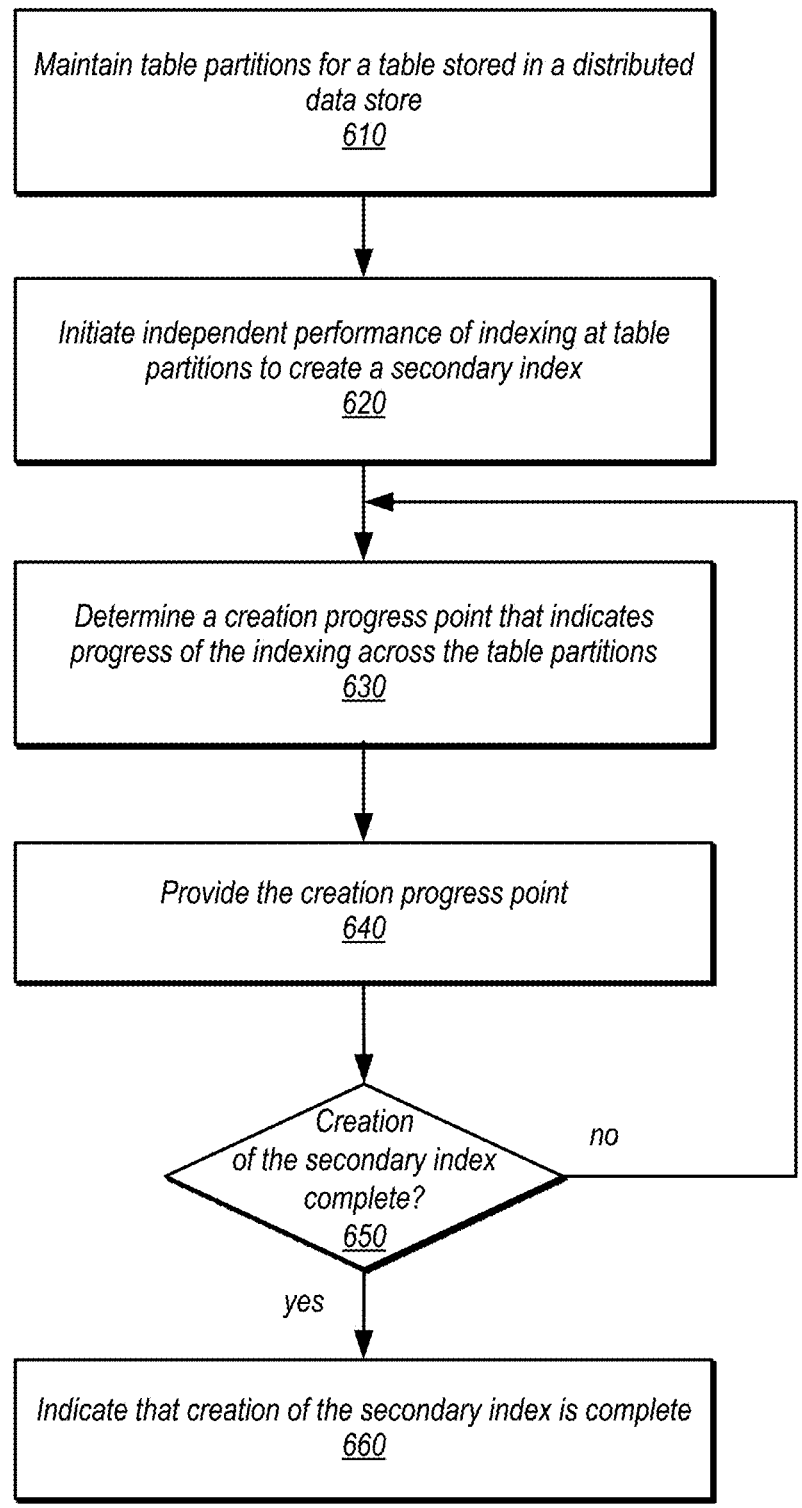
FIG. 6 is a high-level flowchart illustrating various methods and techniques to implement determining indexing progress for a table in a distributed data store, according to some embodiments.
Figure 7:
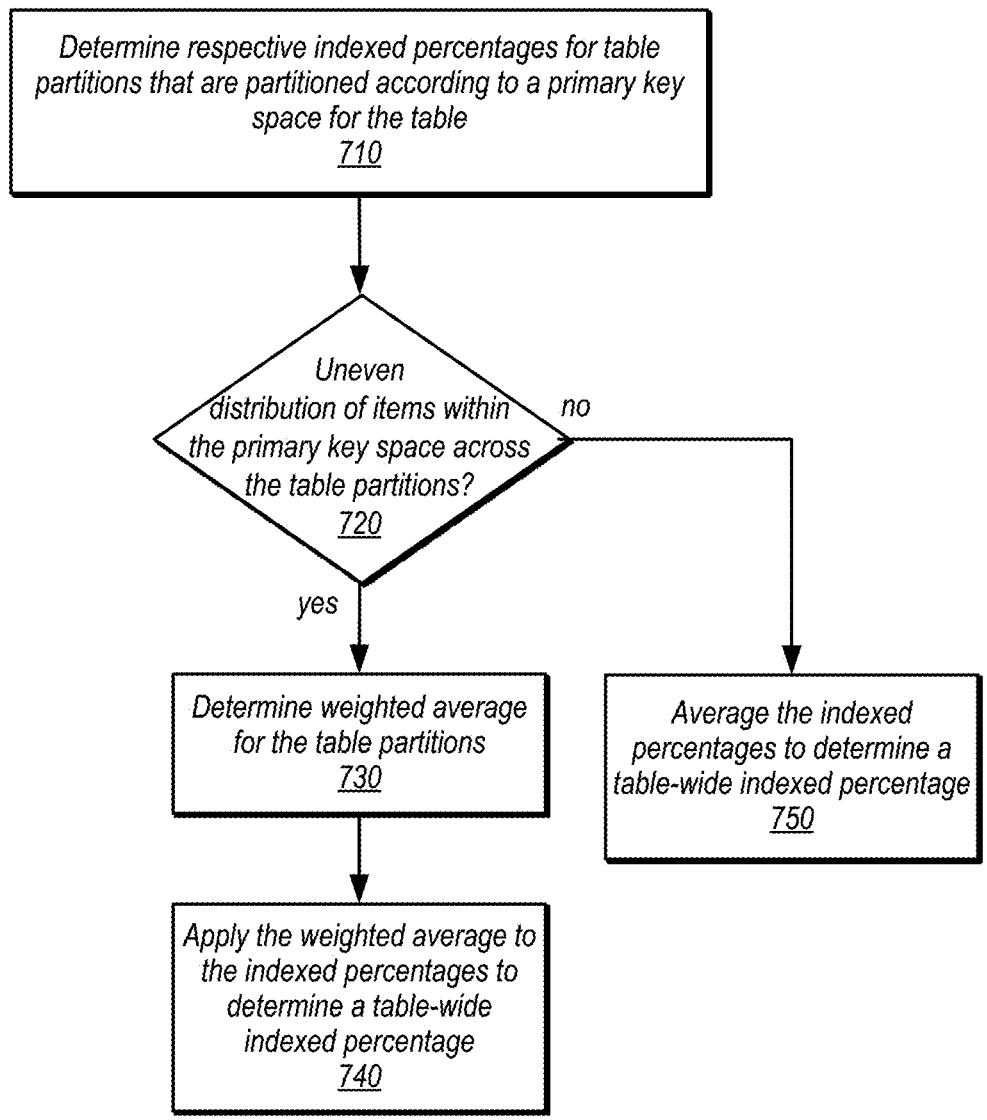
FIG. 7 is a high-level flowchart illustrating various methods and techniques to determine a creation progress point for a secondary index creation, according to some embodiments.

A creation progress point 150 may be determined for the creation of secondary index 130 in order to indicate the progress of indexing distributed table 100 across partitions 120. In this way, a reasonably accurate estimate of completion may be provided so that responsive actions may be taken (if appropriate) to increase the rate of indexing the items in distributed data table 100. FIGS. 6 and 7, discussed below, provide many different examples of techniques for determining creation progress points. For instance completion percentages of partitions 120 as regard to the number of items index within a partition of the primary key space for the table assigned to the partition may be averaged together to create a table-wide percentage of completion. Other techniques may be performed as well.

Please note that previous descriptions are not intended to be limiting, but are merely provided as logical examples of determining indexing progress for a table in a distributed data store.

This specification begins with a general description of storage service implementing a network-based data store that may also determine indexing progress for a table in a distributed data store. Then various examples of the storage service are discussed, including different components/modules, or arrangements of components/module, that may be employed as part of implementing the storage service. A number of different methods and techniques to determine indexing progress for a table in a distributed data store are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
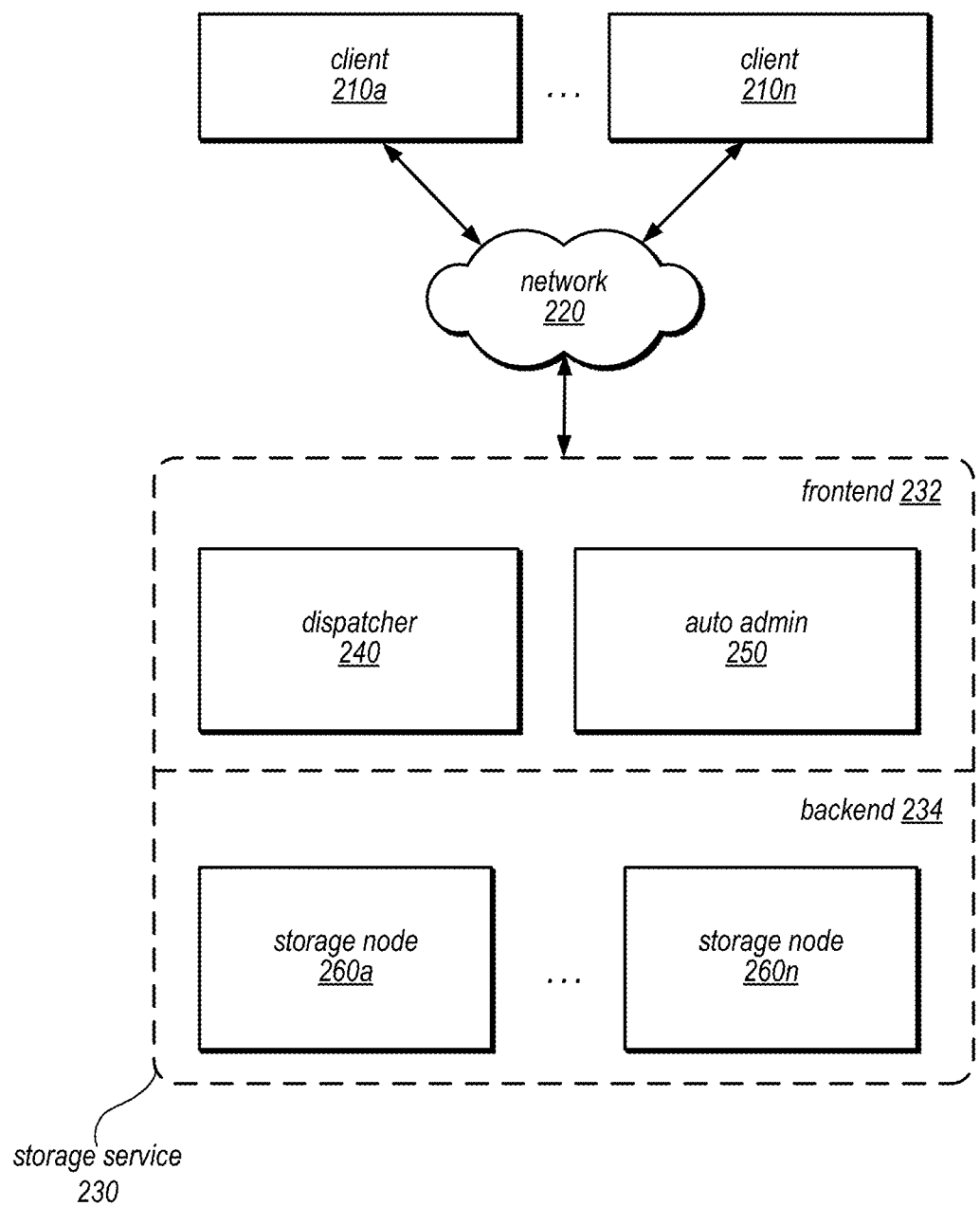
FIG. 2 is a block diagram illustrating a storage service that implements determining indexing progress for a table in a distributed data store, according to some embodiments.

FIG. 2 is a block diagram illustrating a storage service that implements determining indexing progress for a table in a distributed data store, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 8 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 3, network-based storage service 330 may include a dispatcher 340 (which may be configured to receive, authenticate, parse, throttle and/or dispatch service requests, among other things), one or more administrative components, or auto admin instances, 350 (which may be configured to provide a variety of visibility and/or control functions, as described in more detail herein) which may be implemented as part of frontend 232. Storage service 230 may also implement a plurality of storage node instances (shown as 360a-360n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
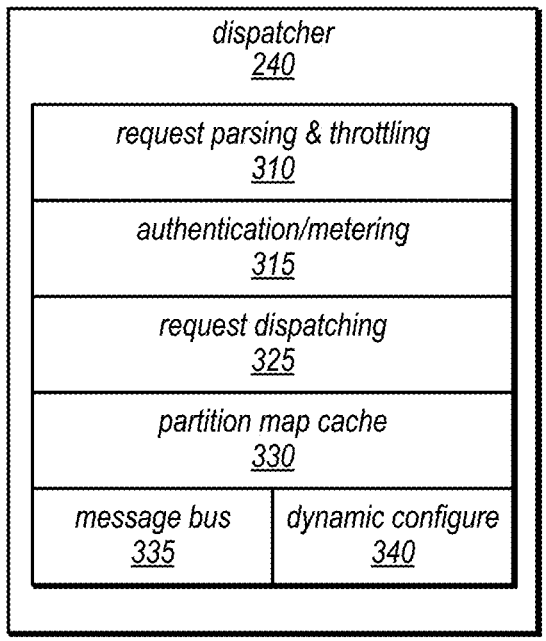
FIGS. 3A-3C are block diagrams illustrating various components of a storage service, according to some embodiments.
Figure 3B:
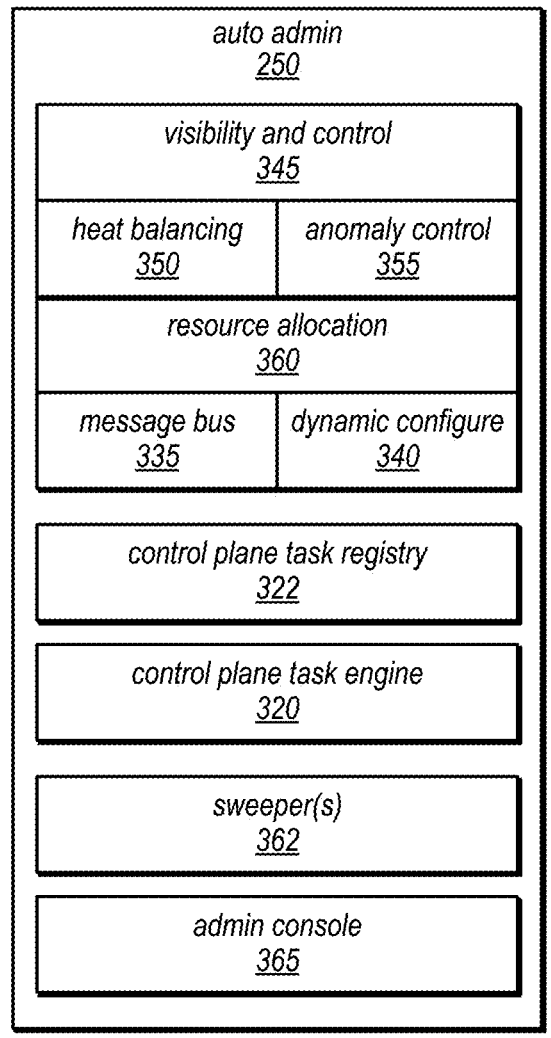
Figure 3C:
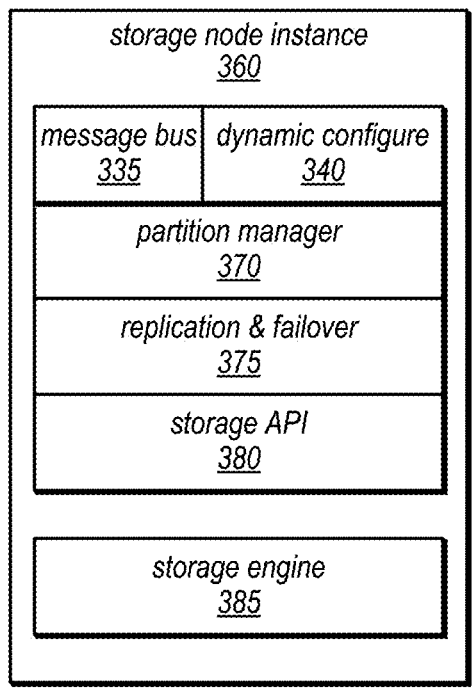

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, and any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380 Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table or to create a secondary index for a table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

As noted above, a table may be stored in multiple partitions at different storage nodes or hosts. Storage engines at the respective storage hosts, such as storage engine 385 in FIG. 3, may be configured to perform indexing of tables to create a secondary index. Each storage engine for a table partition may independently perform indexing of the data in the partition. As storage engines for partitions may also perform other functions, such as servicing access requests to the partition from a client of the storage service, servicing access requests to other data for other partitions for other clients, or perform various background operations or tasks, the rate at which a particular storage engine can index a partition may vary. Moreover, storage engines may have provisioned throughput capacity that guarantees the performance of certain ones of these other actions while indexing of a partition may be implemented as a background process subject to the availability of the storage engine to perform other work in excess of the work to provide the throughput capacity.

Figure 4:
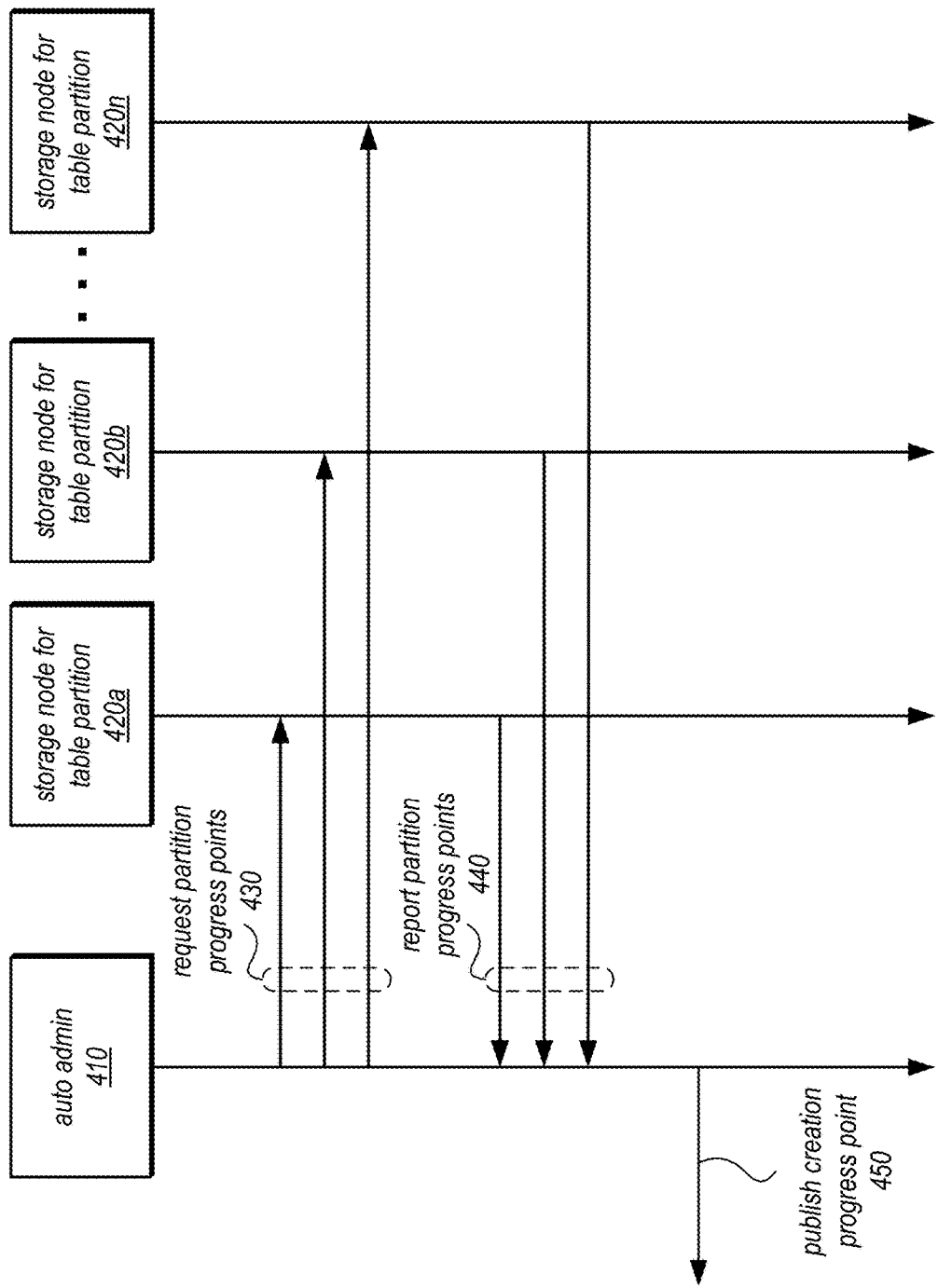
FIG. 4 is a sequence diagram illustrating interactions between an auto admin and storage nodes hosting table partitions to determine a creation progress point, according to some embodiments.

Auto admin nodes or components, such as discussed above with regard to FIGS. 2 and 3, may be implemented as part of a control plane for the storage service to perform various actions to manage data and other operations of the secondary index. Determining creation progress points for a secondary index under creation and providing the creation progress points (as discussed below according to the various techniques described with regard to FIGS. 5-7) may also be performed by one or more auto admin nodes. In order to determine the creation progress points for a secondary index, an auto admin node may communicate with storage nodes (e.g., storage nodes hosting master replicas of a table partition) in order to determine creation progress points. FIG. 4 is a sequence diagram illustrating interactions between an auto admin and storage nodes hosting table partitions to determine a creation progress point, according to some embodiments.

Auto admin 410 may request individual partition progress points 430 from the different storage nodes hosting partitions of a table, such as storage nodes 420a, 420b through 420n. In at least some embodiments, the number partitions for table may dynamically scale in order to satisfy throughput capacity levels requested for a table by a client. Thus auto admin 420 may detect when partitions of a table split (e.g., into two or more new partitions at different storage hosts) and include the storage hosts for the new partitions in a request for partition progress points. The storage nodes may determine individual progress points (e.g., according to the techniques discussed below with regard to FIG. 7) for a particular partition and report back the partition progress points 440 to auto admin 410. For example, the individual storage nodes may calculate the indexed percentages of a partition's primary key space, as discussed below. Auto admin 410 may then utilize the reported partition progress points to generate a creation progress point for a secondary index under creation. Auto admin 410 may publish the creation progress point to a data store, interface (e.g., a graphical user interface such as FIG. 5A or 5B below), or send the creation progress point 450 to a client. Auto admin 410 may perform the sequence of interactions illustrated in FIG. 4 multiple times during the creation of a secondary index in order to provide update creation progress points.

Figure 5A:
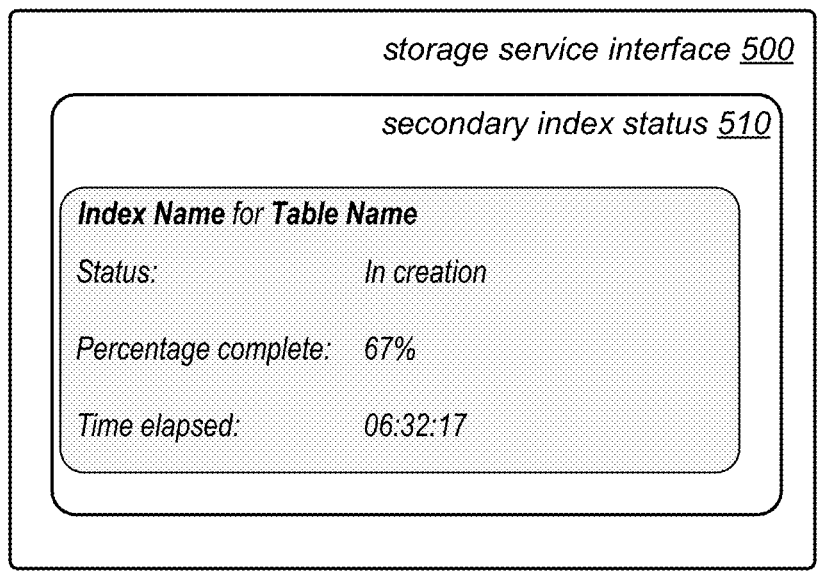
FIGS. 5A and 5B are example graphical user interfaces that provide a creation progress point, according to some embodiments.

FIG. 5A is an example graphical user interface that provides a creation progress point, according to some embodiments. Storage service interface 500 may be a graphical user interface that is hosted or generated for a user of storage service 230. For example, storage service interface 500 may be a website or other network-based site that provides access to storage service users. Storage service interface 500 may implement a display element, such as secondary index status 510, to provide information about a secondary index for a table. For example, in FIG. 5, secondary index status element 510 identifies an index name that is being created and table name that is the source for the secondary index. Secondary index status element 510 may also display a status for table, such as the "In creation" status for a secondary index. When creation of the secondary index is complete, the status information may change to read "Available" or "Online."

Figure 5B:
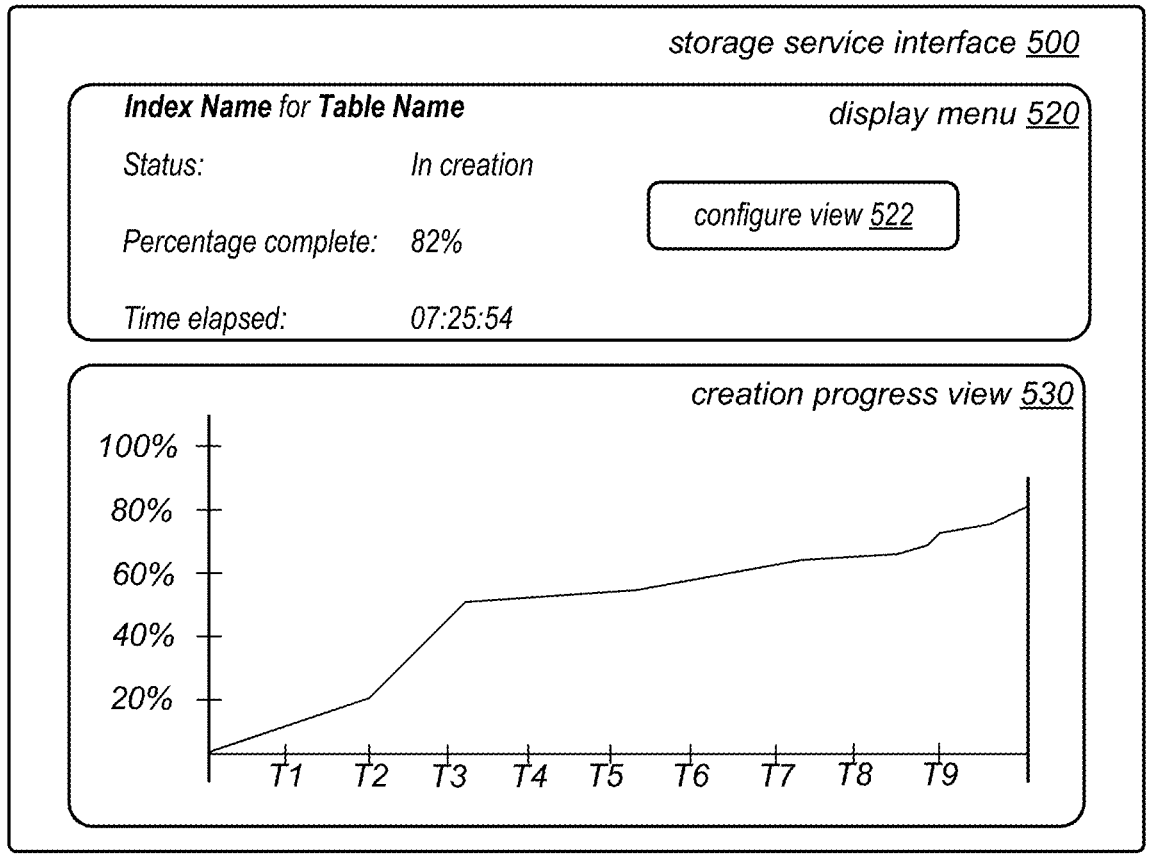

Secondary index status element 510 may also display a current creation progress point, such as a percentage indication (e.g., 67%) of the completion of the identified secondary index. Note that one or more multiple creation progress points may be displayed in many ways. For example, in FIG. 5B creation progress points are plotted over time as a graph in order to display visually the rate at which the secondary index is being created, as illustrated in creation progress view 530. A user interface element, such as configure view element 522, may be implemented to provide various controls to change the way in which creation progress points are displayed. Additionally, secondary index status element 510 may display other information collected for the creation of the secondary index, such as the amount of time elapsed since creation of the secondary index began (e.g., 6 hours 32 minutes and 17 seconds). Please note that FIGS. 5A and 5B are not intended to be limiting as to the number of other ways in which creation progress points may be provided via a graphical user interface. Other combinations of user interface elements or may be implemented. Consider an another graphical user interface that implements control elements to change provisioned throughput for the secondary index creation based on the illustrated rate or time elapsed of the creation (in order to increase the speed at which the secondary index is created).

The examples of determining indexing progress of a table in a distributed data store in FIGS. 2-5 have been given in regard to a data storage service (which may be a non-relational or NoSQL database service). However, various other types of data stores that may provide generation of a secondary index may implement determining indexing progress of a table, such as relational data stores that are distributed. FIG. 6 is a high-level flowchart illustrating various methods and techniques to implement determining indexing progress for a table in a distributed data store, according to some embodiments. These techniques may be implemented using one or storage nodes as described above with regard to FIGS. 2-5, as well as other databases, storage systems, and/or different implementations of a client and/or storage engine, and thus the following discussion is not intended to be limiting as to the other types or configurations of relational or non-relational data stores that may implement the described techniques.

As discussed above, a table may be maintained in distributed fashion across multiple partitions in a distributed data store, as indicated at 610. Data partitions may be stored at single tenant or multi-tenant storage hosts or nodes (e.g., storage nodes 260 in FIGS. 2 and 3). Each storage node or host may not store another partition of the same table, in some embodiments. In at least some embodiments, the partitions of a table may be determined according to a division of a primary key space for accessing items of the table (as discussed below with regard to FIG. 7).

Creation of a secondary index for a table stored in a distributed data store may be performed while the table is online, in some embodiments, available for servicing access requests to data stored in the table at the partitions storing the requested data. Thus, the numbers, size, or value of items within a table partition may change during the creation of a secondary index. In some embodiments, the number of partitions may change depending on changes to the table. If, for instance, the table increases in size, the number of partitions may be increased to provide a similar performance level for accessing the table. Control plane components, such as auto admin 250 in FIGS. 2 and 3 above, may increase the number of partitions.

Creation of a secondary index may be initiated as a result of a request to create the secondary index, which may identify an indexing schema for items in the secondary index. For example, the request may indicate two different attributes to be utilized for indexing items in the secondary index as a hash key and a range key, or a single attribute as the hash key. Other attributes to be included in the secondary index in addition to the hash and/or range key may be specified. As indicated at 620, independent performance of indexing the table may be initiated at the table partitions to create the secondary index. Thus, each table partition may finish indexing at different times (e.g., due to other table related work, such as servicing access requests, or other work performed a storage host or node (e.g., maintenance actions or work for other data hosted at the storage host).

In at least some embodiments, each table partition may perform incremental indexing to index items in a partition according to the identified indexing schema for the secondary index (as may be specified in the creation request noted above). For instance, different ranges of items (or item attribute values) may be evaluated in a contiguous order according to primary key values. Incremental indexing may be performed as a background process so that foreground process operations, such as servicing access requests, may execute with little interference from the indexing. In order to control the rate at which updates to a secondary index are made, various throttling mechanisms may be implemented. As items are identified for inclusion in the secondary index, the items may be stored in the secondary index. In at least some embodiments, the secondary index may be stored separately from the table partitions in one or more index partitions. The table partitions may send requests to store items in the appropriate index partition. Index partitions may store received items according to a provisioned throughput capacity, in some embodiments. As discussed above with regard to FIGS. 2 and 3, the provisioned throughput capacity may be specified in terms of a rate of throughput, such as IOPS.

During the creation of secondary index, a creation progress point may be determined that indicates the progress of the indexing across the table partitions, as indicated at 630. Because the different table partitions index the portions of the table independently, the progress of the table partitions may vary (sometimes widely). Moreover, as discussed below, the distribution of items in the primary key range may be sparse or uneven, causing greater amounts of work to index at some partitions than other partitions. Partitions may also be subject different workloads to perform other tasks. For instance, a higher number of access requests to read or write data to a partition of a table may be directed to some partitions than other partitions, which may have a higher performance priority, slowing down the performance of indexing operations. Thus, a creation progress point may be determined that accounts for the varying progress of the distributed performance of indexing the table.

For example, in at least some embodiments, the total number of items stored in the table may be determined, and the total number of items currently in the index may be determined. The total number of current items in the secondary may then be divided by the total number of items in the table to identify a progress of indexing the items that is table-wide. Consider the scenario where the total number of items in a table is 6,200. If the number of items in the secondary index is 1,500, then a progress point may be determined as 24% (=1,500/6,200) at a minimum. Note, that in some embodiments the table is online (as mentioned above) and therefore the total numbers determined may only be the total numbers for a particular moment in time. More items may be added to the table, or items may be removed from the table (which may also result in items being removed from the secondary index). Another example for determining the creation progress point is discussed below with regard to FIG. 7. Such techniques as discussed below may account for the varying amounts of work performed at individual table partitions.

As indicated at 640, the creation progress point may be provided. The creation progress point may be provided directly to a user, client, or associated contact location for an account associated with the table, or may be provided to a control plane, which may perform responsive actions (e.g., adjusting the performance of index partitions or generating a progress report, chart, graphic or metric for access by a user). In at least some embodiments, the creation progress point may be provided via a command line textual interface for the data store. For example, a user may send a request formatted according to an API or other programmatic interface via a command line interface to the distributed data store. The distributed data store may provide or determine the creation progress point in response and sent back an indication of the creation progress point (e.g., a percentage number) to be textually displayed at the command line interface. Other types of interfaces, such as the graphical user interface discussed above with regard to FIG. 5 may display or communicate creation progress points.

If creation of the secondary index is not complete, as indicated by the negative exit from 650, then other creation progress points may be generated and provided. For example, creation progress points may be generated according to a schedule (e.g., every 5 minutes) in order to provide an up-to-date metric, report, graphic, or other indication of the secondary index creation progress that utilizes the creation progress points. Once creation of the secondary index is complete, no further creation progress reports need be determined, and as indicated at 660 an indication may be provided to a client, user, or associated contact location for an account associated with the table that creation of the secondary index is complete.

One example of determining a creation progress point is discussed in the example techniques below. FIG. 7 is a high-level flowchart illustrating various methods and techniques to determine a creation progress point for a secondary index creation, according to some embodiments. As indicated at 710, respective indexed percentages may be determined for table partitions. In at least some embodiments, a table may be partitioned by dividing a primary key space for the table into different portions. These portions may represent the range of one or more primary keys stored in a partition. For instance, as noted earlier a table may be created that selects as a primary key for items in the table one attribute to serve as a hash key value. This hash key value may be used to determine which partition a particular item is located at. For example, if the hash key value is an alphanumeric identifier (e.g., a unique string of numbers and/or letters), a hash function may be applied to the identifier to generate a hash value. The hash value may then identify the appropriate partition of the table in which the item is to be stored as each partition of a table may be assigned to a range of hash values of the hash key. In some embodiments, a combination of attributes may be selected as a primary key for an item in a table. For instance, an ID number may be selected as a hash key and a date attribute value may be selected as a range key. Thus, items may be partitioned according to the hash value of the hash key and sorted according to an ordering of the range key.

In order to determine the respective indexed percentage of table according to the portion of a primary key space indexed at a particular partition. Indexing of a partition may, in various embodiments be performed by indexing the items as they are ordered in the partition according to the primary key space. Consider the example given above where the alphanumeric identifier is used as a primary key value. A partition may be responsible for storing items with hash key values of 1 to 10,000. Thus, indexing of the items to be identified for inclusion in a secondary index may start at an item with a hash key value of 1 and incrementally progress through the primary key space until an item with a hash key value of 10,000 is reached. Note that not all hash key values may be stored in a table (e.g., no item with a hash key value of 1 may be in the table), therefore the lowest hash key value item may selected first, and then items may be evaluated according to an increasing order of hash key value (even though some hash key values may not have associated items stored in the table).

In some embodiments, the starting primary key value in a portion of the primary key space for a table partition may be identified as the start key (e.g., start key=1 in the previous example). Similarly, the last hash key value in the portion may be identified as the end key (e.g., end key=10,000 in the previous example). A storage host or node that is indexing a table partition may also record, log, or otherwise store an indicator of the last item to be evaluated for inclusion in the secondary index or to be identified for inclusion in the indexed. This last item may be considered a current key (e.g., current key=4,321 in the previous example). An example formula for computing the respective percentage is given below according to the start key, current key, and last key.

$$\text{completion percentage} = \frac{\text{current key} - \text{start key}}{\text{end key} - \text{start key}}$$

Using the example values given above indexed percentage may equal (4,321−1)/(10,000−1)=43.2%. In some embodiments, a storage host or node that stores and manages a table partition may calculate or determine the indexed percentage of the primary key space for the partition and provide the determined indexed percentage to a control plane or other data storage manager (e.g., auto admin 250 in FIGS. 2 and 3).

In some embodiments, the distribution of items across different table partitions may be uneven. For example, if an attribute used for a primary key has a wide range of possible values (e.g., 1-100,000), but a sparse and/or uneven distribution of items within the range of possible values (e.g., most values within the range of 10,000-20,000), then the partitions may store very different numbers of items. Therefore, some partitions may have many more items to evaluate before indexing is complete, while other partitions may have very few items to index. In some embodiments, the uneven distribution of items within the primary key space may be determined, as indicated at 720. This determination may be performed by counting the number of items maintained in each partition of a table. If, for instance, one partition stores a statistically different number of items than other partitions (e.g., greater than a standard deviation), then the distribution may be considered uneven, as indicated by the positive exit from 730.

As indicated at 730, a weighted average may be determined for combining the indexed percentages of the table partitions, in some embodiments. In this way, the progress of an individual partition that accounts for a greater number of items of the table may be weighted more heavily when determining the table-wide index percentage (as discussed below with regard to 740). For example, the item counts stored in each partition may be used to develop averaging weights (e.g., partition A stores 22/500 items, partition B stores 350 of 500 items, and partition C stores 128/500 items). Weights may be determined for each partition (e.g., 22/500=0.044 for partition A, 350/500=0.7 for partition, and 128/500=0.256 for partition C). In at least some embodiments, weighted averages may be determined based on statistics collected for previous secondary indexes created for a table. For instance, a total indexing time value may be collected for each partition and used to determine weights for averaging the indexed percentages.

As indicated at 740, the weighted average may be applied to the indexed percentages to determine a table-wide indexed percentage as a creation progress point. For instance, if partition A is 100%, partition B is 42%, and partition C is 65%, application of the weighted values may result in averaging 4.4% (100*0.044), 29.4% (42*0.7), and 16.64% (65*0.256), which results in a weighted average of 16.81%.

If distribution of items within the primary key space is even (or near even) then a weighted average may not be applied, as indicated by the negative exit from 720. In some embodiments, a non-weighted average may be applied by default to determine creation progress points. As indicated at 750, the indexed percentages may be averaged to determine a table-wide indexed percentage. Considering the example percentages given above (e.g., partition A is 100%, partition B is 42%, and partition C is 65%), then table-wide indexed percentage may be 69%.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
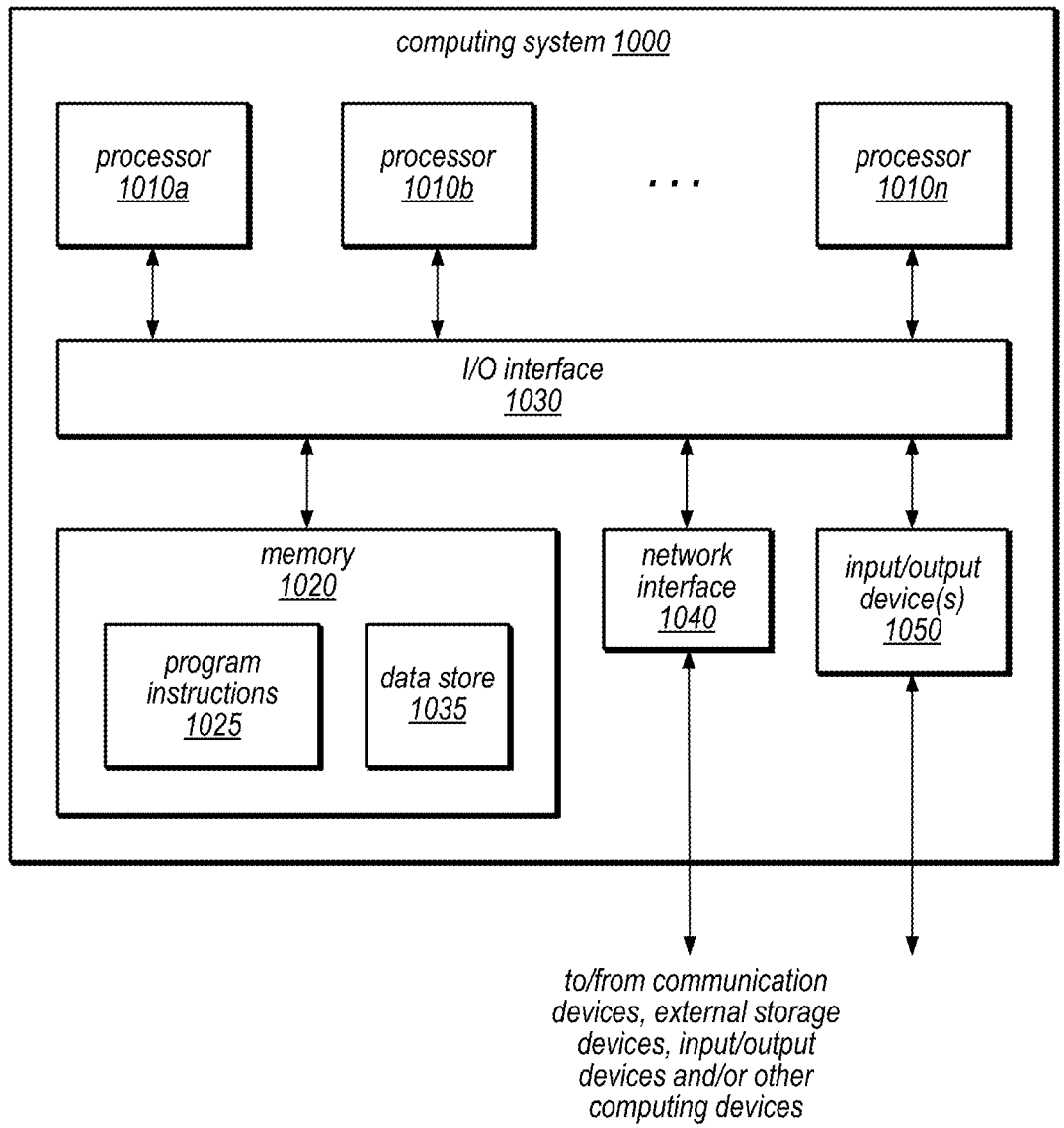
FIG. 8 is a block diagram illustrating an example computing system, according to some embodiments.

Embodiments of determining indexing progress of a table in a distributed data store as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A distributed data store, comprising:
a plurality of computing devices comprising respective processors and a memory to implement a plurality of storage nodes and a control plane;
the plurality of storage nodes configured to store a respective one of a plurality of table partitions for a table stored in the data store;
the control plane for the distributed data store, configured to:
responsive to a request received from a client to create a secondary index for the table:
initiate creation of the secondary index for the table that is stored at one or more other storage nodes in the distributed data store, wherein creation of the secondary index comprises:
the storage nodes index the respective plurality of table partitions independently to identify those items in the table that are to be included in the secondary index; and
the storage nodes send the identified items to the other storage nodes to store the identified items in the secondary index, wherein the storage nodes are available to service requests to the table during the creation of the secondary index;
during the creation of the secondary index:
receive, from the storage nodes, respective individual progress of indexing operations performed independently by the storage nodes at the table partitions;
determine a table-wide percentage value as a creation progress point that indicates progress of completing the secondary index across the plurality of partitions of the table at the one or more other storage nodes, wherein the table-wide percentage is determined from the received respective individual progress of indexing operations; and
report the creation progress point.

2. The system of claim 1, wherein the respective individual progress of indexing operations are respective indexed percentages of portions of a primary key space at the table partitions and wherein to determine the creation progress point, the control plane is configured to average the indexed percentages of the table partitions to determine the table-wide percentage value.

3. The system of claim 1, wherein the storage nodes service requests to the table according to a provisioned throughput capacity for the table and wherein the other storage nodes store the identified items at the secondary index according to a provisioned throughput capacity for the secondary index.

4. The system of claim 3, wherein the distributed data store is a non-relational storage service, wherein the table is stored for a client of the non-relational storage service, and wherein the creation progress points are reported to the client of the non-relational data store via a programmatic interface for the non-relational storage service.

5. A method, comprising:
performing, by one or more computing devices:
responsive to a request received from a client at a distributed data store to create a secondary index for a table maintained in a plurality of table partitions stored in the distributed data store:
creating, by a control plane of the distributed data store, the secondary index for the table that is stored separately from the table partitions, wherein the creating comprises:
causing respective storage nodes that store the table partitions to:
independently perform indexing at the table partitions to identify those items in the table that are to be included in the secondary index;
store the identified items in the secondary index;
during the creating of the secondary index:
receiving, from the storage nodes at the control plane of the distributed data store, respectively determined individual progress of indexing operations independently performed at the table partitions by the storage nodes;
determining, by the control plane of the distributed data store, a table-wide percentage value as a creation progress point that indicates progress of completing the secondary index across the plurality of partitions of the table, wherein the table-wide percentage is determined from the respectively determined individual progress of indexing operations; and providing, by the control plane of the distributed data store, the creation progress point.

6. The method of claim 5, wherein the table partitions are available for servicing access requests directed to the table during the creation of the secondary index.

7. The method of claim 5, wherein the table partitions store items in different portions of the primary key space of the table, wherein the respective individual progress of indexing operations are respective indexed percentages of portions of the primary key space at the table partitions, and wherein determining the table-wide percentage value as the creation progress point comprises averaging the indexed percentages of the table partitions to determine the table-wide percentage value as the creation progress point.

8. The method of claim 7, wherein averaging the indexed percentages of the table comprises applying a weighted average such that at least one of the indexed percentages is weighted more than another one of the indexed percentages.

9. The method of claim 7, further comprising:
collecting one or more index creation performance statistics for the table partitions based on the creating of the secondary index;
performing the creating for another secondary index for the table; and
performing the determining the table-wide percentage value as the creation progress point and the providing the creation progress point during the creation of the other secondary index, wherein the weighted average for averaging the indexed percentages is determined according to the index creation performance statistics.

10. The method of claim 7, wherein at least one of the table partitions splits into two different partitions of the table prior to the creation of one of the one or more creation progress points, and wherein determining the respective indexed percentages of the portions of the primary key space at the table partitions comprises:
detecting the split of the at least one partition; and
including the two different partitions of the at least one split partition in requests sent to the table partitions to obtain the respective indexed percentages of the portions of the primary key space.

11. The method of claim 5, wherein determining the table-wide percentage value as the creation progress point that indicates progress of the indexing across the table partitions comprises:
determining a total number of items currently stored in the secondary index;
determining a total number of items in the table; and
calculating a percentage of items indexed according to the total number of items currently stored in the secondary index and the total number of items in the table.

12. The method of claim 5, wherein the distributed data store is a non-relational data store.

13. The method of claim 5, wherein providing the creation progress point comprises displaying an indication of the creation progress point via graphical user interface.

14. A non-transitory, computer-readable storage medium, storing program instructions that when executed by one or more computing devices cause the one or more computing devices to implement a control plane that implements:
maintaining a plurality of table partitions for a table stored in a distributed data store;
responsive to a request received from a client to create a secondary index for the table:
creating the secondary index for the table that is stored separately from the table partitions, wherein the table partitions are available for servicing access requests to the table during the creation of the secondary index, and wherein the creating comprises:
causing a plurality of storage nodes to:
independently perform indexing at the table partitions to identify those items in the table that are to be included in the secondary index; and
store the identified items in the secondary index;
during the creating of the secondary index:
receiving, from the storage nodes, respectively determined individual progress of indexing operations independently performed at the table partitions by the storage nodes;
determining a table-wide percentage value as a creation progress point that indicates progress of completing the secondary index across the plurality of table partitions, wherein the table-wide percentage value is determined from the received respectively determined individual progress of indexing operations; and
providing the creation progress point.

15. The non-transitory, computer-readable storage medium of claim 14, wherein the table partitions store items in different portions of the primary key space of the table, wherein the respective individual progress of indexing operations are respective indexed percentages of portions of the primary key space at the table partitions, and wherein, in determining table-wide percentage value as the creation progress point, the program instructions cause the one or more computing devices to implement averaging the indexed percentages of the table partitions to determine the table-wide percentage value as the creation progress point.

16. The non-transitory, computer-readable storage medium of claim 15, wherein, in averaging the indexed percentages of the table, the program instructions cause the one or more computing devices to implement applying a weighted average such that at least one of the indexed percentages is weighted more than another one of the indexed percentages.

17. The non-transitory, computer-readable storage medium of claim 14, wherein the creation progress point is provided via a command line interface to the distributed data store.

18. The non-transitory, computer-readable storage medium of claim 14, wherein the identified items are stored at the secondary index according to a throughput capacity provisioned for the secondary index.

19. The non-transitory, computer-readable storage medium of 14, wherein the distributed data store is a relational data store.

20. The non-transitory, computer-readable storage medium of claim 14, wherein the distributed data store is a network-based storage service, wherein the creation progress point is provided to a client of the network-based storage service via a programmatic interface for the network-based storage service.

* * * * *